United States Patent [19]
Van Nee

[11] Patent Number: 5,692,008
[45] Date of Patent: *Nov. 25, 1997

[54] APPARATUS FOR ESTIMATING A LINE OF SIGHT SIGNAL PROPAGATION TIME USING A REDUCED-MULTIPATH CORRELATION FUNCTION

[75] Inventor: Richard D.J. Van Nee, Delft, Netherlands

[73] Assignee: NovAtel, Inc., Calgary, Canada

[*] Notice: The term of this patent shall not extend beyond the expiration date of Pat. No. 5,615,232.

[21] Appl. No.: 531,170

[22] Filed: Sep. 19, 1995

Related U.S. Application Data

[63] Continuation of Ser. No. 157,476, Nov. 24, 1993.

[51] Int. Cl.[6] .............................. H04B 1/707; H04B 1/12; G01S 5/02; H03D 1/04
[52] U.S. Cl. ..................... 375/208; 375/346; 342/357
[58] Field of Search ..................... 375/208, 209, 375/210, 340, 346, 349; 455/52.3, 65

[56] References Cited

U.S. PATENT DOCUMENTS

| | | | |
|---|---|---|---|
| 4,416,017 | 11/1983 | Jasper et al. | 375/346 |
| 4,809,005 | 2/1989 | Couselman, III | 342/357 |
| 5,313,457 | 5/1994 | Hostetter et al. | 370/18 |
| 5,347,536 | 9/1994 | Meehan | 375/346 |
| 5,402,450 | 3/1995 | Lennen | 375/346 |

*Primary Examiner*—Stephen Chin
*Assistant Examiner*—Jeffrey W. Gluck
*Attorney, Agent, or Firm*—Cesari and McKenna, LLP

[57] ABSTRACT

A method and device for processing a signal are described, wherein an estimate of a multipath-induced contribution to a demodulated navigation signal is calculated and subtracted from said demodulated navigation signal to obtain an estimated line of sight contribution to said demodulated navigation signal, and a propagation time $\tau_0$ is calculated from the thus calculated line of sight contribution to said demodulated navigation signal, such that a very accurate propagation time $\tau_0$ of said navigation signal can be calculated.

14 Claims, 8 Drawing Sheets

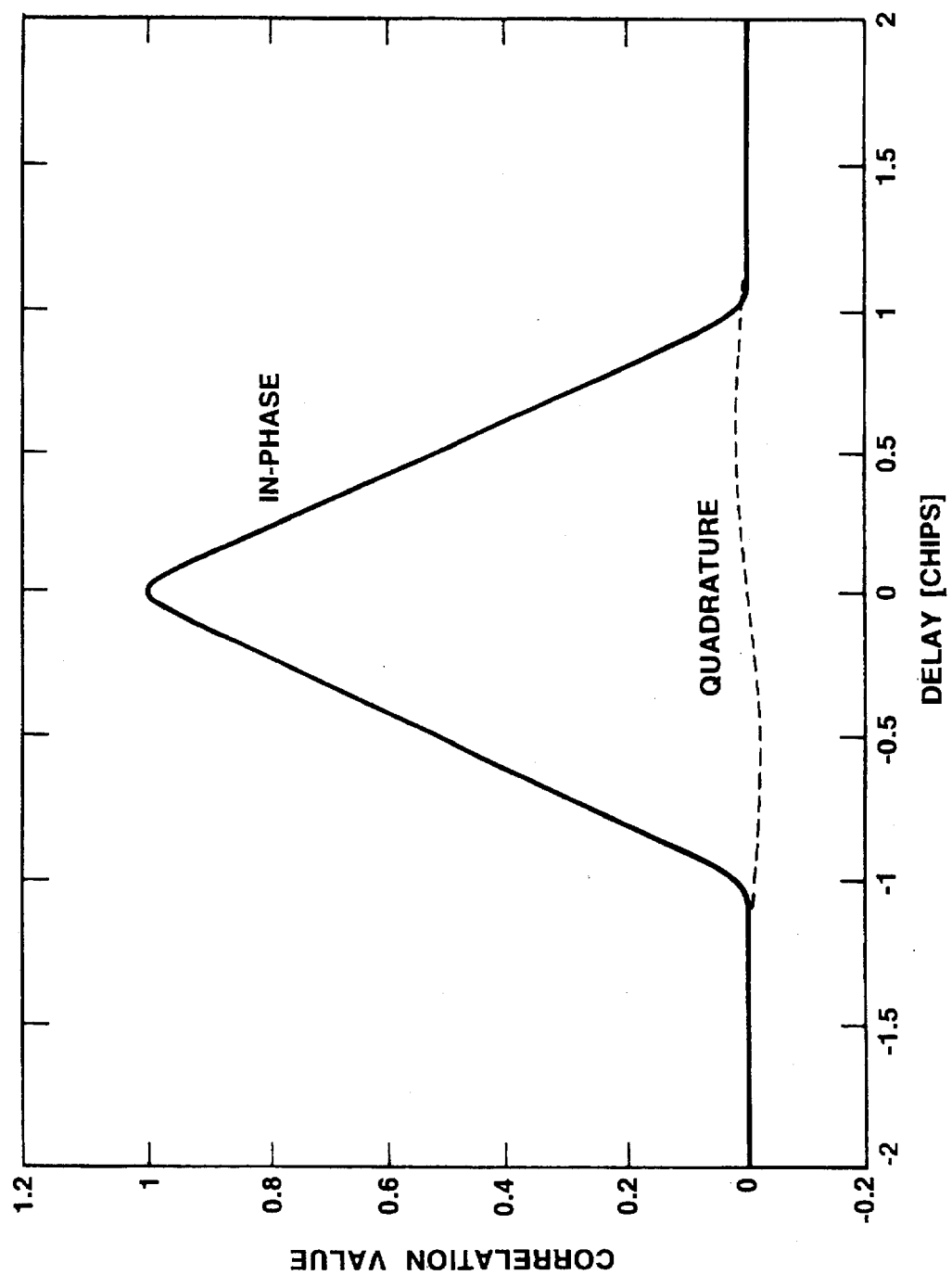

APPARATUS FOR ESTIMATING A LINE OF SIGHT SIGNAL PROPAGATION TIME USING A REDUCED-MULTIPATH CORRELATION FUNCTION

CROSS REFERENCE TO RELATED APPLICATIONS

The application is a continuation of application Ser. No. 08/157,476, filed Nov. 24, 1993.

BACKGROUND OF THE INVENTION

1. Field of the Invention

The present invention relates to a method and device for processing a signal, for use in communication systems or satellite navigation systems, for instance. More particularly, the present invention relates to a method and device for processing a signal wherein any errors caused by multipath are eliminated or at least reduced. In one particular embodiment, the present invention relates to a navigation system.

2. Description of the Prior Art

In principle, communication from a transmitter to a receiver involves the transmission, by the transmitter, of a carrier wave signal which is coded by an information signal, such as by AM or FM, and the reception, by the receiver, of the coded signal. In the receiver, the received signal is decoded for obtaining the information therein. The propagation time of the signal, i.e., the time which passes between the moment of transmission and the moment of reception, depends upon the distance between the transmitter and the receiver, and upon the propagation speed of the carrier wave signal, as is well known.

In practice, the carrier wave signal reaches the receiver not only directly, i.e., via the line of sight, but also via one or more reflections from objects such as buildings, mountains, clouds, atmospheric layers, etc. Since the propagation path via reflection is always longer than the line of sight, the propagation time of the signal via reflection is always longer than the propagation time of the signal via the line of sight, i.e., a reflected signal always has a certain delay with respect to the direct signal. The receiver can not distinguish between the direct signal and a reflected signal, and the combination of the direct signal as received by the receiver and the reflected signals as received by the receiver is processed as if it were an undistorted signal; however, said combination obviously contains an error with respect to the signal as transmitted. This problem is commonly known as "multipath". Multipath can also be caused by diffraction.

Communication of the above-described kind is commonly used for many applications, and in most applications it is a general desire to reduce the errors caused by multipath. However, one application where reducing such errors is extremely important is navigation, such as satellite navigation, and the present invention will be described with reference to a navigation system, although it is explicitly noted that the invention is not restricted to such use.

In the context of the present application, navigation is based on the principle of determining the distance between an object and a reference position by means of a communication signal. A reference station, such as a satellite, emits a signal, which is received by a receiver associated with said object. By measuring the propagation time of the signal, the distance of the object to the reference station can be calculated. Similarly, the distances of the object to a second and possibly further reference stations are calculated. In the case of a stationary reference station, the position of the reference station is constant and may be incorporated in the receiver as a constant value. In the case of a non-stationary reference station such as a satellite, the signal may contain information regarding the position of the reference station. Since, therefore, the positions of the reference stations are "known" by the receiver, it is thus possible to calculate the exact position of the object.

Examples of such navigation systems of the above-described type are known under the names GPS and LORAN-C. These systems are used, for instance, by ships at sea, and by aeroplanes in their approaching an airport. For a more detailed description of such systems, reference is made to the following publications:

J. J. Spilker: "Digital Communications by Satellite", Prentice Hall, New Jersey, 1977;

N. Ackroyd and R. Lorimer: "Global Navigation: A GPS User's Guide", Lloyd's of London Press, London, 1990;

B. Forsell: "Radio Navigation Systems", Prentice Hall, 1991, ISBN 0-13-751058-6.

The contents of these publications is incorporated in the present application by reference.

It will be evident that in the above-mentioned applications, accuracy is of utmost importance, and any error due to multipath should be eliminated or at least minimized.

SUMMARY OF THE INVENTION

It is, therefore, a general objective of the present invention to eliminate multipath-induced errors.

This and other objects are achieved in accordance with the present invention by producing a method and a device for processing a received signal, said method and device having the capability of detecting the presence of multipath and the capability of determining the contribution of the line of sight signal and the contribution of the multipath signals. The inventive method and device then removes the contribution of the multipath signals from the received signal, thus leaving an uncorrupted line of sight signal. As such, using the uncorrupted line of sight signal, an accurate propagation time from a signal source to the receiver can be determined.

BRIEF DESCRIPTION OF THE DRAWINGS

The invention will be explained in more detail by discussing a preferred embodiment with reference to the drawing, wherein:

FIGS. 3A–3F illustrate a correlation operation;

DETAILED DESCRIPTION OF THE PREFERRED EMBODIMENT

Figure 1:
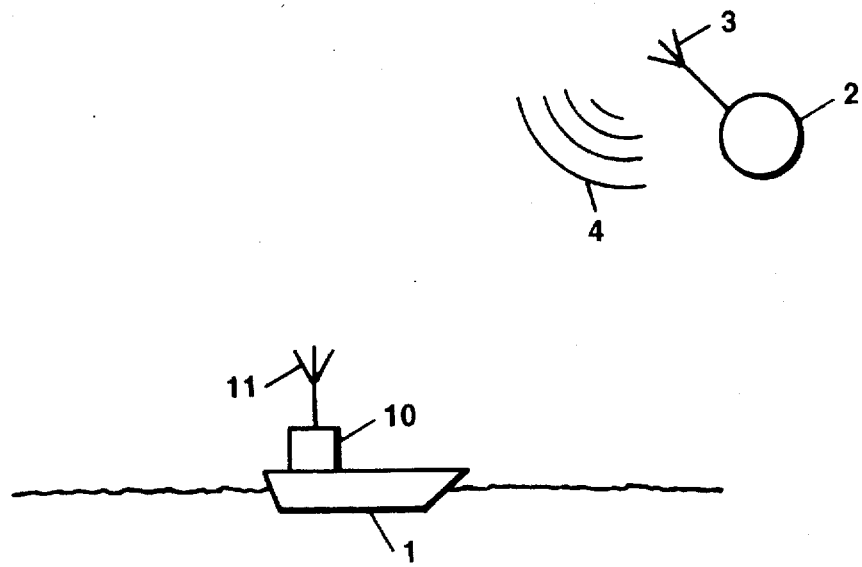
FIG. 1 schematically shows a situation for employing the present invention.

FIG. 1 schematically shows a ship 1 at sea, and a satellite 2 emitting a signal 4. The satellite equipment for generating and emitting said signal is generally indicated at 3. The construction of the satellite equipment 3 does not form part of the invention, and knowledge of this construction is not necessary for understanding the present invention. Therefore, the satellite 2 and its satellite equipment 3 will not be discussed further. Suffice it to say that the satellite 2 may be a satellite as being used at present, such as the GPS satellites.

Figure 2:
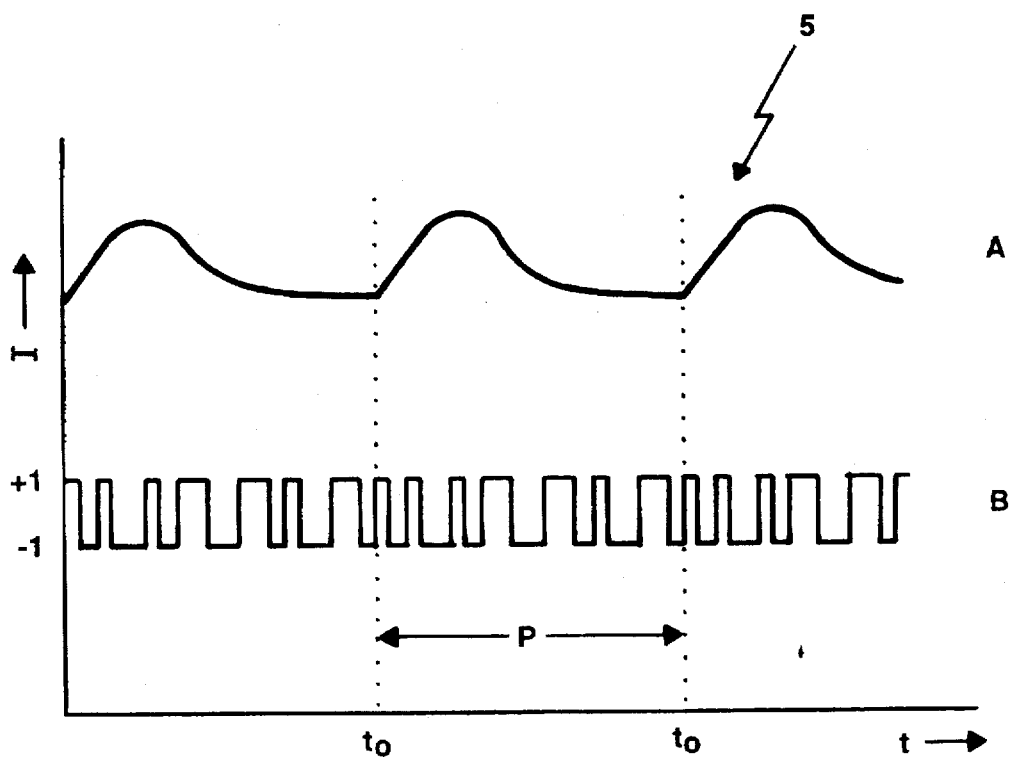
FIG. 2 schematically shows the shape of an undistorted navigation signal.

For the purpose of the present discussion it will be neglected that the signal 4 contains data carrying an information message, and only a navigation signal 5 modulated on the carrier wave of the signal 4 is considered. FIG. 2 schematically shows the shape of the navigation signal 5 as emitted by the equipment 3. In FIG. 2, the ordinate is the signal intensity I in arbitrary units, and the abscissa is the time t. The navigation signal 5 may have the form of a single pulse, such as is employed in the LORAN-C system (FIG. 2A), or the navigation signal 5 may have the form of a sequence of pulses (FIG. 2B), such as is employed in the GPS system. FIG. 2 illustrates that the navigation signal 5 is emitted periodically, the period P being 1 ms in the above-mentioned systems. It is noted that the beginning of each signal period is emitted at moments $t_0$ in time which are very accurately specified under the control of a system clock.

Figures 3A, 3B, 3C, 3D, 3E:
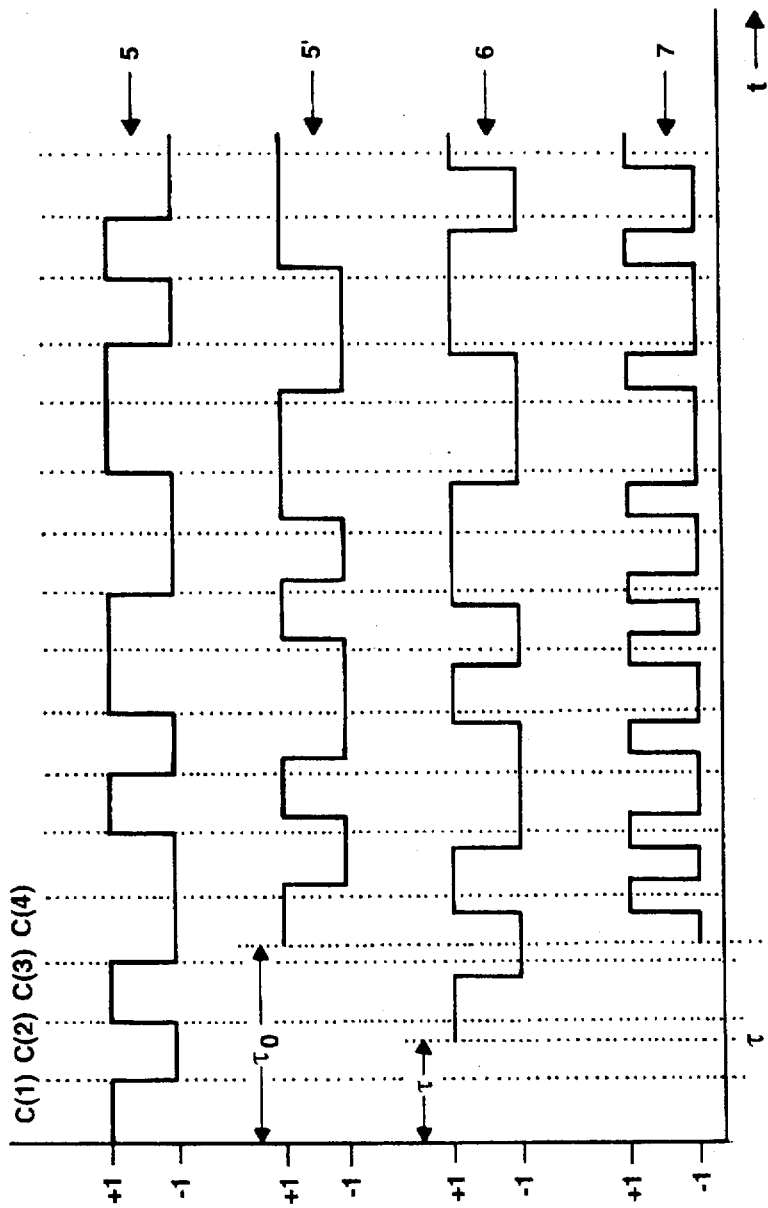

FIG. 3A illustrates the GPS navigation signal 5 using a larger time scale, wherein only a first part of the signal is shown. The GPS navigation signal 5 constitutes a pseudo random noise code containing a predetermined number of code bits. In order to distinguish the code bits from data bits, the code bits are usually referred to as "chips". Each chip can have two possible values, namely +1 or −1. In the GPS system, said predetermined number is 1023. In the following, the individual chips will be referred to as C(1), C(2), ... C(1023). Each satellite 2 has its own characteristic code as defined by the set of values of C(1), C(2), ... C(1023).

The receiver 10 aboard the ship 1 comprises at least one code generator, which can be set to generate a reference signal corresponding to the characteristic code of a specific satellite 2. In general, the receiver 10 is equipped with a memory where information on the characteristic codes of a plurality of satellites is stored, so that an operator needs only to indicate which satellite he is interested in and the code generator of the receiver 10 will automatically generate a reference signal corresponding to the characteristic code of that specific satellite of interest (tuning the code generator).

Figure 4:
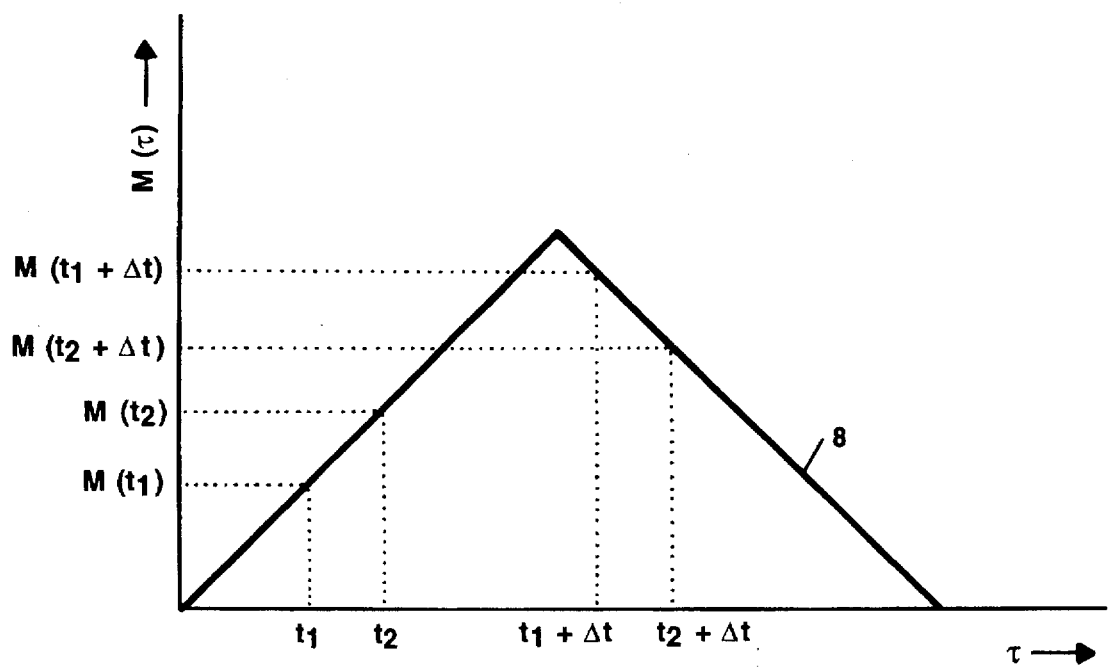
FIG. 4 schematically shows the idealized shape of a correlation function, and illustrates the conventional method of processing the navigation signal.

FIGS. 3 and 4 illustrate the principle of detecting the propagation time of the signal 4, which will be referred to as delay time $\tau_0$. As mentioned above, FIG. 3A shows the navigation signal 5 as emitted by the satellite 2, i.e., the beginning of C(1) coincides with the beginning $t_0$ of a time period. Therefore, FIG. 3A can also be considered a representation of the reference signal as generated by the code generator of the receiver 10. FIG. 3B shows the navigation signal 5' as received at an input 11 of the receiver 10 (in the absence of noise and multipath), i.e., the beginning of C(1) being delayed by delay time $\tau_0$ with respect to $t_0$. It is noted that in FIG. 3 the carrier wave and data are not shown.

In order to determine the time delay $\tau_0$, a control device (not shown) associated with the receiver 10 provides a local reference signal 6, which is identical to the reference signal but shifted over a certain shift time $\tau$. This local reference signal 6 is shown in FIG. 3C.

In order to determine whether the (known) shift time $\tau$ equals the (unknown) time delay $\tau_0$, said control device compares said local reference signal 6 with the navigation signal 5' as received at an input 11 of the receiver 10. More specifically, said control device performs a multiplication operation on the local reference signal 6 and the received navigation signal 5', i.e., the local reference signal 6 is multiplied point by point with the received navigation signal 5'. Subsequently, the resulting signal, which is shown in FIG. 3D and which will be referred to as multiplied signal 7, is averaged, i.e., the multiplied signal 7 is integrated over a sufficiently large time to provide a mean value $M(\tau)$ of the multiplied signal 7.

The multiplied signal 7 can only take the values +1 or −1, depending on whether the values of the signals 6 and 5' are identical to each other or not, respectively. Therefore, the mean value $M(\tau)$ of the multiplied signal 7 will be a value between +1 and −1, too. Since the shape of the multiplied signal 7 depends on the shift time $\tau$, the exact value of $M(\tau)$ depends on the chosen value of the shift time $\tau$. Since the navigation signal 5 is a pseudo random code, said mean value $M(\tau)$ will be practically zero for most values of the shift time $\tau$, and will differ significantly from zero only if the shift time $\tau$ approaches the delay time $\tau_0$. In an ideal case, if the shift time $\tau$ equals the delay time $\tau_0$, said mean value $M(\tau)$ will be equal to 1 (one). FIG. 3E illustrates this characteristic of said mean value $M(\tau)$ as a function of the shift time $\tau$, this function being referred to as correlation function 8.

The exact shape of the correlation function 8 is known in advance, and depends on the specific code of the satellite in question. In FIG. 3E, this shape is shown as being an ideal triangle. The width W of the triangle is a known constant value, for practical purposes equal to twice the duration of a chip; therefore, the correlation function 8 is fully determined by the coordinates $(\tau_0, M(\tau_0))$ of its maximum. Herein $\tau_0$ is the relevant parameter determining the position of the correlation function 8 with respect to the beginning of the time periods.

It is noted that in practice the correlation function 8 is not an ideal triangle as shown in FIG. 3E but is more or less curved, as is shown in FIG. 3F, depending on the characteristics of the receiver.

Further it is noted that in systems such as LORAN-C, wherein in each time period only one navigation signal pulse having a predetermined shape is emitted instead of a pseudo random code, the navigation signal pulse itself can be substituted for the correlation function 8 as discussed above.

In the following, the conventional method employed in conventional receivers for determining the propagation time $\tau_0$ is explained with reference to FIG. 4, which shows the correlation function 8 on a larger scale. First, the local reference signal 6 is generated for a first value $t_1$ of the shift time $\tau$, and the corresponding mean value $M(t_1)$ of the multiplied signal 7 is calculated. Second, the local reference signal 6 is generated for a second value $t_1+\Delta t$ of the shift time, and the corresponding mean value $M(t_1+\Delta t)$ of the multiplied signal 7 is calculated. Herein, the sample spacing, indicated as $\Delta t$, is a constant value.

From the respective values $M(t_1)$ and $M(t_1+\Delta t)$ an error signal $\epsilon_1 = M(t_1) - M(t_1+\Delta t)$ is calculated. This error signal is used to control the shift time of the local reference signal 6, such that when the mean value $M(\tau)$ is subsequently calculated for two values $t_2$ and $t_2+\Delta t$, the error signal $\epsilon_2 = M(t_2) - M(t_2+\Delta t)$ is less than $\epsilon_1$. This procedure, which is known as a Delay Locked Loop (DLL), is executed continuously so that in practice at any particular moment $\epsilon \approx 0$, and, based on the assumption that the peak of the correlation function 8 is symmetrical, the propagation time $\tau_0$ can be calculated according to the formula $$\tau_0 = t_i + \tfrac{1}{2}\Delta t.$$

Figure 5:
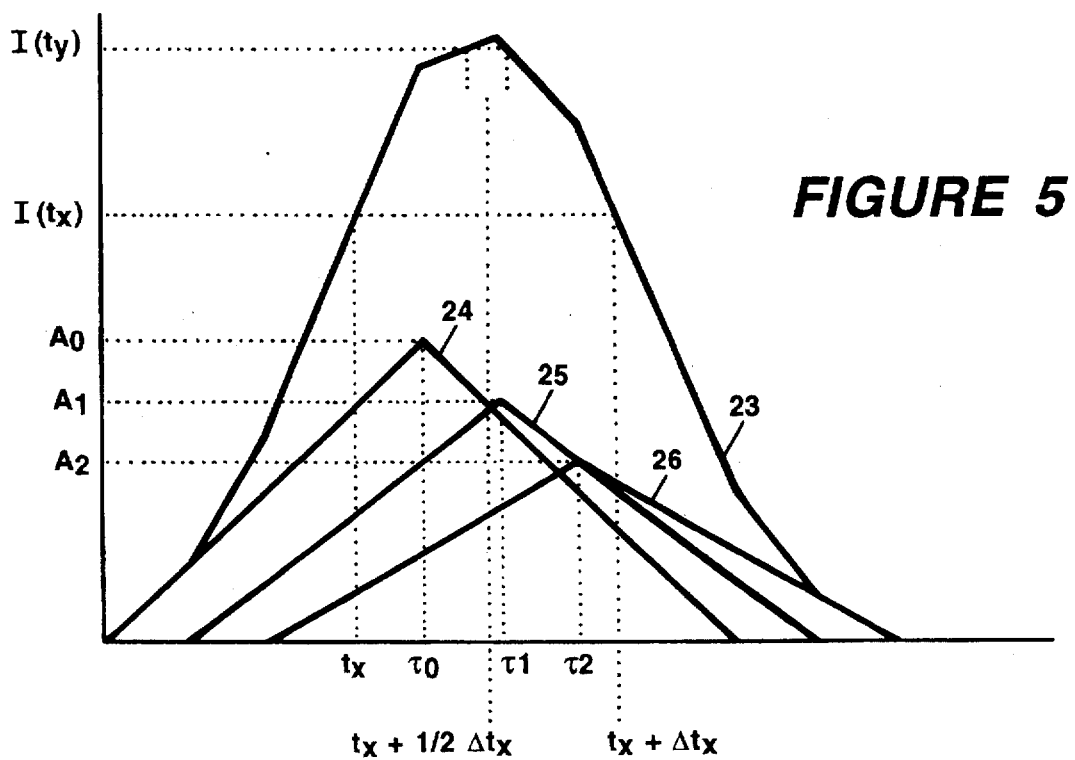
FIG. 5 schematically shows a combination of three correlation function peaks of a multipath signal, and illustrates the drawbacks of the conventional method.

A serious disadvantage of this conventional method is that the calculated propagation time $\tau_0$ is not accurate enough, which is demonstrated with reference to FIG. 5, which illustrates the shape of a correlation function 23 which is a combination of a correlation function 24 for the navigation signal 5' as received via the line of sight and two correlation functions 25, 26 for the navigation signal 5' as received via reflection. The propagation times $\tau_1$ and $\tau_2$ of the reflection peaks 25, 26 are larger than the propagation time $\tau_0$ of the line of sight peak 24, and their respective maxima A1 and A2 are shown as being smaller than the maximum A0 of the line of sight peak 24. The widths W1 and W2 of the reflection peaks 25, 26 are substantially equal to the width W0 of the line of sight peak 24.

In the conventional method, the correlation function 23 is treated as if no multipath is present, i.e., the correlation function 23 is processed based on the assumption that it is an undistorted correlation function. Then, the conventional method may, for instance, result in $I(t_x)$ and $I(t_x+\Delta t_x)$ satisfying the stop criterion for the error signal $\epsilon$, and the propagation time $\tau_x$ is calculated as $\tau_x = t_x + \tfrac{1}{2}\Delta t_x$, which is obviously not equal to the propagation time $\tau_0$ of the line of sight peak 24.

In fact, the time $\tau_x$ calculated by the conventional method is not even an accurate estimate of the position of the maximum of the peak 23, because the peak 23 is not symmetrical in the presence of multipath. The conventional method can only be improved in this respect by decreasing $\Delta t$, in order to sample the peak 23 at higher positions on the peak. This may, for instance, result in $I(t_y)$ and $I(t_y+\Delta t_y)$ satisfying the stop criterion for the error signal $\epsilon$, and the propagation time $\tau_y$ is calculated as $\tau_y = t_y + \tfrac{1}{2}\Delta t_y$, which is a closer estimate of the position of the maximum of the peak 23 but, however, still does not equal $\tau_0$.

In fact, even if the conventional method were modified such that the highest point of the peak 23 were calculated accurately, it is inherently impossible for the conventional method to yield the correct value of $\tau_0$ in situations as illustrated in FIG. 5 because, as can clearly be seen in FIG. 5, the maximum of the combination peak 23 is shifted with respect to the maximum of the line of sight peak 24.

It is noted that in FIG. 5 the peaks are shown in their ideal form, i.e., with sharp tips. However, as noted above, in practice the tips will be curved, which will cause a further increase in the deviation of the calculated value of the propagation time with respect to $\tau_0$.

The present invention is based on mathematical insight in the actual shape of the navigation signal 5' and the correlation function 23 in the presence of multipath. Therefore, according to one aspect of the invention the influence of multipath is eliminated, or at least minimized, by measuring the complete shape of the correlation function 23 of the received navigation signal 5', calculating an estimate of the multipath-induced contribution and the line of sight contribution to said correlation function, and calculating the propagation time $\tau_0$ from the thus calculated line of sight contribution to said correlation function.

This will be explained in the following discussion, wherein p(t) is a function representing the navigation signal 5, which corresponds to the reference signal as stored in the memory of the receiver 10. It is assumed that there are $M_{ac}$ reflection signals (multipath) contributing to the correlation function 23 of the received navigation signal 5', and that each of said $M_{ac}$ reflection signals can be represented by the function $x_i(t) = a_i \cdot p(t-\tau_i) \cdot \cos(\omega t + \theta_i)$, wherein $a_i$ is the amplitude of a signal with index i;

$\tau_i$ is the delay time of the signal with index i;

$\theta_i$ is the phase of the signal with index i;

$\omega$ is the angular frequency of the carrier signal of the navigation signal.

Then, in the presence of multipath propagation, the actually received navigation signal 5' as received by the receiver 10 can be written as $$r(t) = \sum_{i=0}^{M_{ac}} x_i(t) + n(t) = \sum_{i=0}^{M_{ac}} a_i \cdot p(t-\tau_i) \cdot \cos(\omega t + \theta_i) + n(t) \qquad (1)$$

Herein, the index i=0 denotes the line of sight signal, while the index i=1, 2, ... $M_{ac}$ denotes the multipath signals. Further, n(t) denotes a noise component.

In practice, the signal $x_i(t)$ is also multiplied by a data signal, which can be removed by multiplying the signal with an estimated data signal, as will be evident to a person skilled in the art since such data signal must also be removed in conventional coherent delay lock loop systems. For simplicity of notation, the data signal is left out of formula (1).

It is observed that $a_i$, $\tau_i$ and $\theta_i$ are unknown variables which are representative of the signal with index i, and which may vary in time. According to maximum likelihood estimation theory, the best estimates $\hat{a}_i$, $\hat{\tau}_i$ and $\hat{\theta}_i$ of the unknown parameters $a_i$, $\tau_i$ and $\theta_i$ are those values which minimize $L[s(t)]$ which is defined as $$L[s(t)] = \int_0^T [r(t) - s(t)]^2 dt \qquad (2)$$

wherein s(t) is defined as $$s(t) = \sum_{i=0}^{M_{ac}} \hat{x}_i(t) = \sum_{i=0}^{M_{ac}} \hat{a}_i \cdot p(t-\hat{\tau}_i) \cdot \cos(\omega t + \hat{\theta}_i) \qquad (3)$$

It is noted that in practice, where the signals are sampled, the above integral operation can be replaced by a summation over all samples in a certain time interval.

A criterion equivalent to the above is that all partial derivatives of $L(s(t))$ are zero. It can be shown that this criterion is fulfilled with $$\hat{\tau}_i = \qquad (4)$$

$$\max_{\tau} \left\{ Re\left[ \left( R_x(\tau) - \sum_{\substack{m=0 \\ m \neq i}}^{M_{ac}} \hat{a}_m \cdot R(\tau - \hat{\tau}_m) \cdot \exp(j\hat{\theta}_m) \right) \cdot \exp(-j\hat{\theta}_i) \right] \right\}$$

$$\hat{a}_i = Re\left[ \left( R_x(\hat{\tau}_i) - \sum_{\substack{m=0 \\ m \neq i}}^{M_{ac}} \hat{a}_m \cdot R(\hat{\tau}_i - \hat{\tau}_m) \cdot \exp(j\hat{\theta}_m) \right) \cdot \exp(-j\hat{\theta}_i) \right]$$

$$\hat{\theta}_i = \arg\left( R_x(\hat{\tau}_i) - \sum_{\substack{m=0 \\ m \neq i}}^{M_{ac}} \hat{a}_m \cdot R(\hat{\tau}_i - \hat{\tau}_m) \cdot \exp(j\hat{\theta}_m) \right)$$

wherein $$\max_{\tau} \{X\}$$

is defined as that value of $\tau$ for which $X(\tau)$ has its global maximum;

$$R_x(\tau) = \frac{2}{T} \int_0^T r(t) \cdot p(t-\tau) \cdot \exp(-j\omega t) dt$$

is the in-phase (real part) and quadrature (imaginary part) downconverted correlation function, corresponding to the combination correlation function 23 discussed in the above example; and $R(\tau)$ is the in-phase (real part) and quadrature (imaginary part) reference correlation function, corresponding to the correlation function 8 discussed in the above example, defined as the correlation function that will occur in practice in the receiver, and normalized such that at the peak the maximum value is one and the phase is zero, as illustrated in FIG. 3F. According to the invention it is preferred that the reference correlation function is measured in the absence of noise and multipath, using a signal simulator, and that this shape is stored in a memory of the receiver as the reference correlation function, for instance in the form of a table or a function representing said shape.

It will be clear that the objective of the invention is attained as soon as the equations (4) are solved, because then the delay time $\tau_0$ of the line of sight signal can be considered calculated accurately by $\hat{\tau}_0$. However, the equations (4) represent recurrent relations between the optimal parameters $\hat{\tau}_0, \hat{a}_0, \hat{\theta}_0, \hat{\tau}_1, \hat{a}_1, \hat{\theta}_1, \ldots \hat{\tau}_{Mac}, \hat{a}_{Mac}, \hat{\theta}_{Mac}$, for a specific value of Mac. Although in theory it will be possible to solve equation (4) directly by using an iterative matrix calculation, this approach costs so much calculating time that a real-time implementation is only possible with extremely fast and therefore large and expensive computer systems, if at all.

Figure 6:
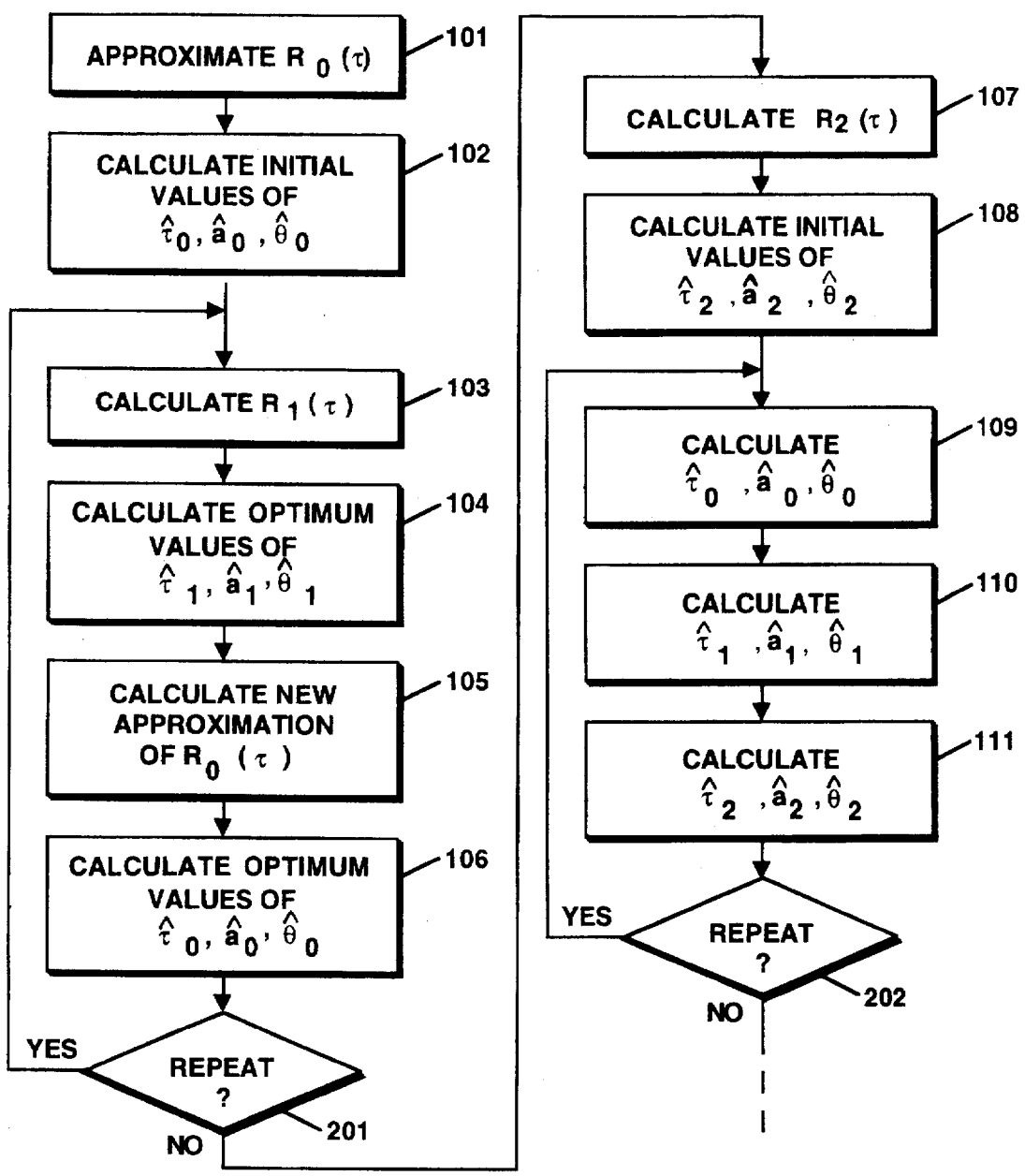
FIG. 6 illustrates the steps taken by a preferred method of the invention.

In a more practical procedure according to the invention, the equations (4) are calculated iteratively, as described as follows with reference to FIG. 6.

In a first step 101, a first peak correlation function $R_0(\tau)$ is approximated as being equal to $R_x(\tau)$, according to the formula $R_0(\tau) = R_x(\tau)$.

In a second step 102, parameters $\hat{\tau}_0, \hat{a}_0, \hat{\theta}_0$ are calculated, in a manner to be described later, as optimum values for the largest peak in $R_0(\tau)$.

In a third step 103, the contribution of said calculated parameters $\hat{\tau}_0, \hat{a}_0, \hat{\theta}_0$ is subtracted from $R_x(\tau)$ to yield a second peak correlation function $R_1(\tau)$, according to the formula $R_1(\tau) = R_x(\tau) - \hat{a}_0 \cdot R(\tau - \hat{\tau}_0) \cdot \exp(j\hat{\theta}_0)$.

In a fourth step 104, parameters $\hat{\tau}_1, \hat{a}_1, \hat{\theta}_1$ are calculated as optimum values for the largest peak in $R_1(\tau)$.

In a fifth step 105, the contribution of said calculated parameters $\hat{\tau}_1, \hat{a}_1, \hat{\theta}_1$ is subtracted from $R_x(\tau)$ to yield a new approximation of the first peak correlation function $R_0(\tau)$ according to the formula $R_0(\tau) = R_x(\tau) - \hat{a}_1 \cdot R(\tau - \hat{\tau}_1) \cdot \exp(j\hat{\theta}_1)$.

In a sixth step 106, new parameters $\hat{\tau}_0, \hat{a}_0, \hat{\theta}_0$ are calculated as optimum values for the largest peak in the new approximation $R_0(\tau)$ as calculated in the fifth step.

The third, fourth, fifth, and sixth steps are then repeated until a suitable stop criterion 201 is fulfilled. As an example for such a suitable stop criterion 201, said steps may be repeated for a predetermined number of times, for instance 10. However, it is also possible to repeat said steps until the parameters $\hat{\tau}_0, \hat{a}_0, \hat{\theta}_0$ and $\hat{\tau}_1, \hat{a}_1, \hat{\theta}_1$ have converged according to predetermined convergence criteria, as will be clear to a person skilled in the art. A convergence criterion which has proven to yield good results is detecting whether the estimated delay $\hat{\tau}_0$ and/or $\hat{\tau}_1$ changes less than 0.1 ns between two successive iteration steps.

At this point, for two signals the estimated contributions $\hat{x}_0(t)$ and $\hat{x}_1(t)$ to the received navigation signal 5' are provided as $\hat{x}_0(t) = \hat{a}_0 \cdot p(t - \hat{\tau}_0) \cdot \cos(\omega t + \hat{\theta}_0)$ and $\hat{x}_1(t) = \hat{a}_1 \cdot p(t - \hat{\tau}_1) \cdot \cos(\omega t + \hat{\theta}_1)$, and the estimated contributions $R_0(\tau)$ and $R_1(\tau)$ to the in-phase/quadrature downconverted correlation function $R_x(\tau)$ are provided as $R_0(\tau) = \hat{a}_0 \cdot R(\tau - \hat{\tau}_0) \cdot \exp(j\hat{\theta}_0)$ and $R_1(\tau) = \hat{a}_1 \cdot R(\tau - \hat{\tau}_1) \cdot \exp(j\hat{\theta}_1)$.

In case an estimated contribution for a third signal is to be calculated, the contribution of said calculated parameters $\hat{\tau}_0, \hat{a}_0, \hat{\theta}_0$ and $\hat{\tau}_1, \hat{a}_1, \hat{\theta}_1$ is, in a seventh step 107 subtracted from $R_x(\tau)$ to yield a third peak correlation function $R_2(\tau)$, according to the formula $$R_2(\tau) = R_x(\tau) - \hat{a}_0 \cdot (\tau - \hat{\tau}_0) \cdot \exp(j\hat{\theta}_0) - \hat{a}_1 \cdot R(\tau - \hat{\tau}_1) \cdot \exp(j\hat{\theta}_1).$$

In an eighth step 108, parameters $\hat{\tau}_2, \hat{a}_2, \hat{\theta}_2$ are calculated as optimum values for the largest peak in $R_2(\tau)$.

In a ninth step 109, new parameters $\hat{\tau}_0, \hat{a}_0, \hat{\theta}_0$ are calculated as optimum values for the largest peak in $R_0(\tau) = R_x(\tau) - \hat{a}_1 \cdot R(\tau - \hat{\tau}_1) \cdot \exp(j\hat{\theta}_1) - \hat{a}_2 \cdot R(\tau - \hat{\tau}_2) \cdot \exp(j\hat{\theta}_2)$.

In a tenth step 110, new parameters $\hat{\tau}_1, \hat{a}_1, \hat{\theta}_1$ are calculated as optimum values for the largest peak in $R_1(\tau) = R_x(\tau) - \hat{a}_0 \cdot R(\tau - \hat{\tau}_0) \cdot \exp(j\hat{\theta}_0) - \hat{a}_2 \cdot R(\tau - \hat{\tau}_2) \cdot \exp(j\hat{\theta}_2)$, using the parameters $\hat{\tau}_0, \hat{a}_0, \hat{\theta}_0$ as calculated in the ninth step.

In an eleventh step 111, new parameters $\hat{\tau}_2, \hat{a}_2, \hat{\theta}_2$ are calculated as optimum values for the largest peak in $R_2(\tau) = R_x(\tau) - \hat{a}_0 \cdot R(\tau - \hat{\tau}_0) \cdot \exp(j\hat{\theta}_0) - \hat{a}_1 \cdot R(\tau - \hat{\tau}_1) \cdot \exp(j\hat{\theta}_1)$, using the parameters $\hat{\tau}_0, \hat{a}_0, \hat{\theta}_0$ as calculated in the ninth step and the parameters $\hat{\tau}_1, \hat{a}_1, \hat{\theta}_1$ as calculated in the tenth step.

The ninth, tenth, and eleventh steps are then repeated until a stop criterion 202 is fulfilled, which may be equivalent to the stop criterion 201.

In an analogous way, the contribution of a fourth peak, and new values for the first three peaks, can be calculated iteratively. Then, the contribution of a fifth peak, and new values for the first four peaks, can be calculated iteratively, and so on, as will be clear to a skilled person.

Stated differently, the contributions of all signals are not calculated simultaneously from the outset, but first the contribution of only one signal is calculated, then the contribution of a second signal is added and the contributions of both signals are optimized, then the contribution of a third signal is added and the contributions of all three signals are optimized, etc. It is possible to continue this procedure until the contributions of all $M_{ac}+1$ signals are calculated. However, it is noted that in practice the number $M_{ac}$ of multipath signals actually occurring is not known in advance and is not even necessarily constant. Therefore, after each cycle in the above-described procedure when the contributions of M+1 signals are calculated, wherein M is the considered number of multipath contributions, the multipath error is not eliminated sufficiently if M is less than $M_{ac}$, whereas an increased noise error is induced if M is larger than $M_{ac}$. Therefore, in order to eliminate this problem, according to the invention it is preferred to solve the equations (4) successively for M=0, 1, 2, ..., $M_{max}$, as explained above, and to stop this iteration process as soon as a suitable stop criterion is fulfilled, or when M=$M_{max}$, whichever occurs first, wherein $M_{max}$ is a predetermined fixed value serving as an upper limit for the iteration process in order to prevent the calculation time from becoming too large. A suitable value is for instance $M_{max}=3$ or $M_{max}=4$.

It is noted that, in the procedure as described in the above, the first peak to be calculated is referred to with index 0, whereas previously the index 0 was used to refer to the line of sight peak which, however, does not necessarily correspond to the firstly calculated peak. In the following, the index 0 will again be used to refer to the line of sight peak. It is noted that, after the above-described process is completed, the set of parameters corresponding to the line of sight peak can be recognized easily because this will be the set having the smallest value of $\hat{\tau}_i$.

Said iteration process may be stopped as soon as it is detected that the error increases, as expressed by the suitable stop criterion of formula (5):

$$SRR(M) \leq SRR(M-1) \qquad (5)$$

Then, the parameter values obtained for $M-1$ are chosen as optimum values.

In formula (5), $SRR(M)$ is defined as the Signal-to-Residual-Ratio according to:

$$SRR(M) = \hat{a}_0^2 / V(M) \qquad (6)$$

wherein $V(M)$ is defined as the variance of the residuals after estimation of all parameters according to formula (7):

$$V(M) = \frac{1}{D} \int_{\hat{\tau}_0 - \frac{1}{2}D}^{\hat{\tau}_0 + \frac{1}{2}D} \left| R_x(\tau) - \sum_{m=0}^{M} \hat{a}_m \cdot R(\tau - \hat{\tau}_m) \cdot \exp(j\hat{\theta}_m) \right|^2 dt \qquad (7)$$

wherein D is the delay window, i.e. the delay interval which contains the line of sight correlation peak and the peaks of the interfering multipath signals. In practice, a suitable length for D is twice the duration of a chip, and a suitable position for D is such that the estimated line of sight correlation peak is positioned substantially in the center of D or within the first half of D, because multipath contributions are only expected at delay values larger than the delay value of the line of sight correlation peak.

It is noted that in practice the in-phase/quadrature down-converted correlation function $R_x(\tau)$ is sampled, so that the integral operation of formula (7) can be replaced by a summation operation.

As an alternative stop criterion, it is possible to use formula (8) instead of formula (5)

$$SRR(M) \geq \delta \qquad (8)$$

wherein $\delta$ is a suitable treshold value which, for instance, may be chosen equal to that specific Signal-to-Noise-Ratio SNR which just leads to an acceptable error.

Another alternative stop criterion is expressed by formula (9)

$$SRR(M) \geq \frac{\hat{a}_0}{\max(|res|)} \qquad (9)$$

wherein $\max(|res|)$ is defined as the maximum absolute value of the residual function res in the interval D, res being defined as $$res(\tau) = R_x(\tau) - \sum_{m=0}^{M} \hat{a}_m \cdot R(\tau - \hat{\tau}_m) \cdot \exp(j\hat{\theta}_m) \qquad (10)$$

In a simple implementation of the present invention, which has proved to yield sufficiently good results in most practical circumstances, $M_{max}$ is chosen as a fixed number equal to one. In that case, approximate parameter values for the two strongest peaks, i.e., the line of sight peak and the strongest reflection peak, are calculated. Only in those cases wherein two or more reflection peaks of almost identical intensity are present will the remaining error be of practical significance.

In the following, a description is given of the most preferred procedure for calculating parameters $\hat{\tau}$, $\hat{a}$, $\hat{\theta}$ as optimum values for the largest peak in a correlation function $R_i(\tau)$, such as described with reference to, for instance, step 102.

Firstly, it is determined which one of the complex samples of said correlation function provides the largest value for $[Re(R_i(\tau))]^2 + [Im(R_i(\tau))]^2$. The corresponding delay will be referred to as $\tau_{max}$. In other words:

$$\tau_{max} = \max_{\tau} \{[Re(R_i(\tau))]^2 + [Im(R_i(\tau))]^2\} \qquad (11)$$

From said one sample, the phase $\hat{\theta}$ is estimated according to formula (12):

$$\begin{aligned}
\hat{\theta} &= a\tan\left(\frac{Im(R_i(\tau_{max}))}{Re(R_i(\tau_{max}))}\right) & \text{if } Re(R_i(\tau_{max})) > 0 \\
\hat{\theta} &= a\tan\left(\frac{Im(R_i(\tau_{max}))}{Re(R_i(\tau_{max}))}\right) + \pi & \text{if } Re(R_i(\tau_{max})) < 0 \\
\hat{\theta} &= \pi/2 & \text{if } Re(R_i(\tau_{max})) = 0 \text{ and} \\
& & Im(R_i(\tau_{max})) > 0 \\
\hat{\theta} &= -\pi/2 & \text{if } Re(R_i(\tau_{max})) = 0 \text{ and} \\
& & Im(R_i(\tau_{max})) < 0
\end{aligned} \qquad (12)$$

Once the phase is known, it is used to perform a phase rotation on the input signal in order to obtain a coherently demodulated signal according to formula (13):

$$R'_i(\tau) = Re(R_i(\tau)) \cdot \cos\hat{\theta} + Im(R_i(\tau)) \cdot \sin\hat{\theta} \qquad (13)$$

The thus obtained phase demodulated signal is used to estimate the delay and the amplitude.

The delay $\hat{\tau}$ of a peak can be estimated in various ways. In the following, two basically different approaches will be discussed.

firstly, it is possible to use all samples of the peak, and to calculate interpolation values to the samples, in order to obtain a more or less continuous representation of the shape of the peak. Subsequently, the position of the maximum can be calculated using well-known analytical methods like the Newton-Raphson method. This method provides an optimal delay estimate with respect to the noise variance, if the sampling interval satifies the Nyquist criterion.

secondly, it is possible to use only a small number of samples of the peak. This method is based on the fact that the shape of the peak is known in advance and is preferred according to the invention because it is much faster than the previously described method. Said number of samples can be as small as two, as will be discussed in the following with reference to FIG. 7.

Figure 7A:
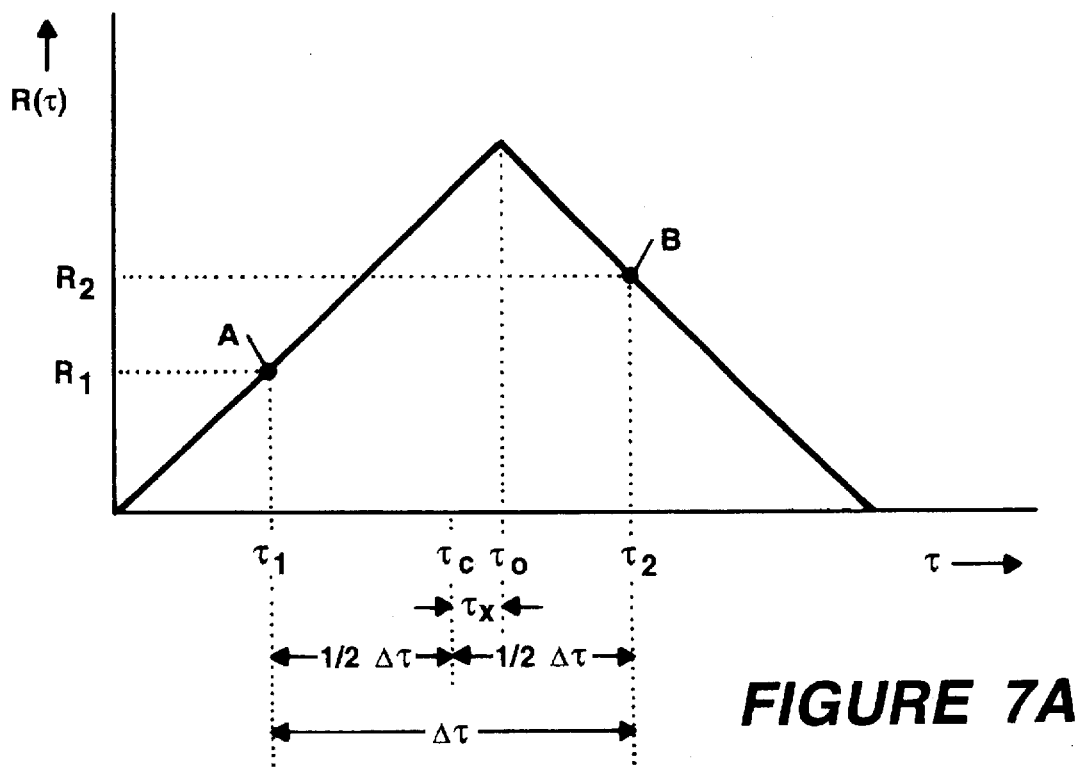
FIGS. 7A–7B schematically shows the idealized shape of a correlation function, and illustrates the inventive method of processing the navigation signal.

FIG. 7A shows a correlation function, comparable to the correlation function 8 as shown in FIG. 4. The delay of the peak is indicated as $\tau_0$. Samples A and B of this function are shown, taken at two different delays $t_1$ and $t_2$, spaced by the sampling interval $\Delta\tau$, such that $t_2 = t_1 + \Delta\tau$. The measured correlation magnitudes $R'_i(t_1)$ and $R'_i(t_2)$ are indicated as R1 and R2, respectively.

In the following, the delay lying exactly in the middle of $t_1$ and $t_2$ will be indicated as $\tau_c$, such that $t_1 = \tau_c - \frac{1}{2}\Delta\tau$ and $t_2 = \tau_c + \frac{1}{2}\Delta\tau$.

Further, the distance from $\tau_c$ to $\tau_0$ will be indicated as $\tau_x$, such that $t_1 = \tau_0 - \tau_x - \frac{1}{2}\Delta\tau$ and $t_2 = \tau_0 - \tau_x + \frac{1}{2}\Delta\tau$. It will be evident that the measured correlation magnitudes $R'_i(\tau_c - \frac{1}{2}\Delta\tau)$ and $R'_i(\tau_c + \frac{1}{2}\Delta\tau)$ can be considered as functions of $\tau_x$, since $\tau_0$ and $\Delta\tau$ are constant.

With said measured correlation magnitudes $R'_i(\tau_c - \frac{1}{2}\Delta\tau)$ and $R'_i(\tau_c + \frac{1}{2}\Delta\tau)$, a shape parameter f is calculated, which is defined according to formula (14):

$$f(\tau_x) = \frac{R\left(\tau_0 - \tau_x + \frac{1}{2}\Delta\tau\right) - R\left(\tau_0 - \tau_x - \frac{1}{2}\Delta\tau\right)}{\left|R\left(\tau_0 - \tau_x + \frac{1}{2}\Delta\tau\right)\right| + \left|R\left(\tau_0 - \tau_x - \frac{1}{2}\Delta\tau\right)\right|} \quad (14)$$

Figure 7B:
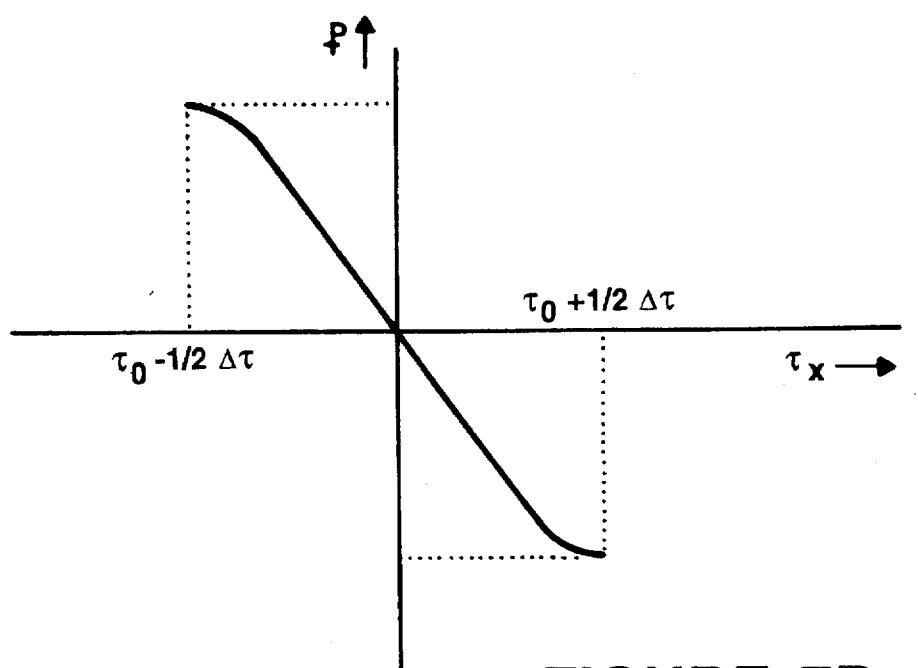

Therefore, f is also a function of $\tau_x$. In FIG. 7B a graph is shown of $f(\tau_x)$, the vertical axis having arbitrary units. It appears that f is a continuously descending function in a certain area around the maximum, which means that there exists a one-to-one relationship between each value of $\tau_x$ and each value of f. The shape of the function $f(\tau)$ depends on the shape of the correlation function, the characteristics of the receiver, and the magnitude of $\Delta\tau$. Since, as is mentioned above, the shape of the correlation function can be established in advance for each receiver, it is also possible to calculate the function $f(\tau)$ in advance, to calculate the inverse function $f^{-1}$, and to store this inverse function in a memory of the receiver, for instance as a table or a polynomial representation.

During operation, two sample values $R'_i(\tau_c - \frac{1}{2}\Delta\tau)$ and $R'_i(\tau_c + \frac{1}{2}\Delta\tau)$ of the peak are used to calculate f according to formula (14). Using the stored inverse function $f^{-1}$, $\tau_x$ is then calculated. Then, $\tau_0$ is estimated as $\tau_0 = t_1 + \tau_x + \frac{1}{2}\Delta\tau = \tau_c + \tau_x$.

Preferably, $t_1$ and $t_1 + \Delta\tau$ are chosen as close to the peak as possible, more preferably at opposite sides of the peak, because this will yield the most accurate result.

As an alternative, one might define f according to $$f(\tau_x) = \frac{R\left(\tau_0 - \tau_x + \frac{1}{2}\Delta\tau\right)}{R\left(\tau_0 - \tau_x - \frac{1}{2}\Delta\tau\right)} \quad (15)$$

In another alternative embodiment, four sampled values are used, wherein f can be defined according to:

$$f(\tau_x) = \frac{R\left(\tau_0 - \tau_x - \frac{3}{2}\Delta\tau\right) - 3R\left(\tau_0 - \tau_x - \frac{1}{2}\Delta\tau\right) + 3R\left(\tau_0 - \tau_x + \frac{1}{2}\Delta\tau\right) - R\left(\tau_0 - \tau_x + \frac{3}{2}\Delta\tau\right)}{N} \quad (15a)$$

or $$f(\tau_x) = \frac{R(\tau_0 - \tau_x - 2\Delta\tau) - 2R(\tau_0 - \tau_x - \Delta\tau) + 2R(\tau_0 - \tau_x + \Delta\tau) - R(\tau_0 - \tau_x + 2\Delta\tau)}{N} \quad (15b)$$

Herein, N is a normalisation parameter, equal to the sum of several absolute measured values. For instance, $N = |R(\tau_0)|$ or $N = |R(\tau_0 - \frac{1}{2}\Delta\tau)| + |R(\tau_0 + \frac{1}{2}\Delta\tau)|$ In theory, such a third order difference method offers the advantage of being less susceptible to multipath, because the differencing operations act like a deconvolution, decreasing the pulse width and causing overlapping pulses to become more separated. On the other hand, inaccuracies in the receiver, especially in the local reference signal, will affect the accuracy of the achieved results more seriously.

As an alternative to formula (13), it is possible to use an incoherently demodulated signal according to, for instance, formula (13a) or (13b):

$$R_i(\tau) = [Re(R_i(\tau))]^2 + [Im(R_i(\tau))]^2 \quad (13a)$$

$$R_i(\tau) = \sqrt{[Re(R_i(\tau))]^2 + [Im(R_i(\tau))]^2} \quad (13b)$$

The fastest way of estimating the amplitude â of the largest peak in a signal is by simply chosing the largest sample value as being the estimate of the amplitude. The resulting error can be made acceptably small, for instance by chosing $\Delta\tau$ arbitrarily small. It is also possible to use the delay $\tau$ as calculated above to control the sampling means, such that sampling of the peak occurs exactly at (or very close to) the calculated top of the peak.

To estimate the amplitude, it is also possible to use similar techniques as described in the above in relation to the delay. A normalized peak shape function g can be defined as $$g(\tau) = \frac{R(\tau)}{R(\tau_0)} \quad (15)$$

Using one measured amplitude sample x and an estimated delay $\tau$ as calculated with the above method, the amplitude can be estimated according to:

$$\hat{a} = \frac{x}{g(\tau)} \quad (16)$$

As an alternative, it is possible to use the second order derivative of the peak, according to:

$$g(\tau_x) = \frac{R(\tau_0 - \tau_x - \Delta\tau) - 2R(\tau_0 - \tau_x) + R(\tau_0 - \tau_x + \Delta\tau)}{N} \quad (17)$$

and to proceed in a similar way as described in the above with respect to formula (15).

Figure 8:
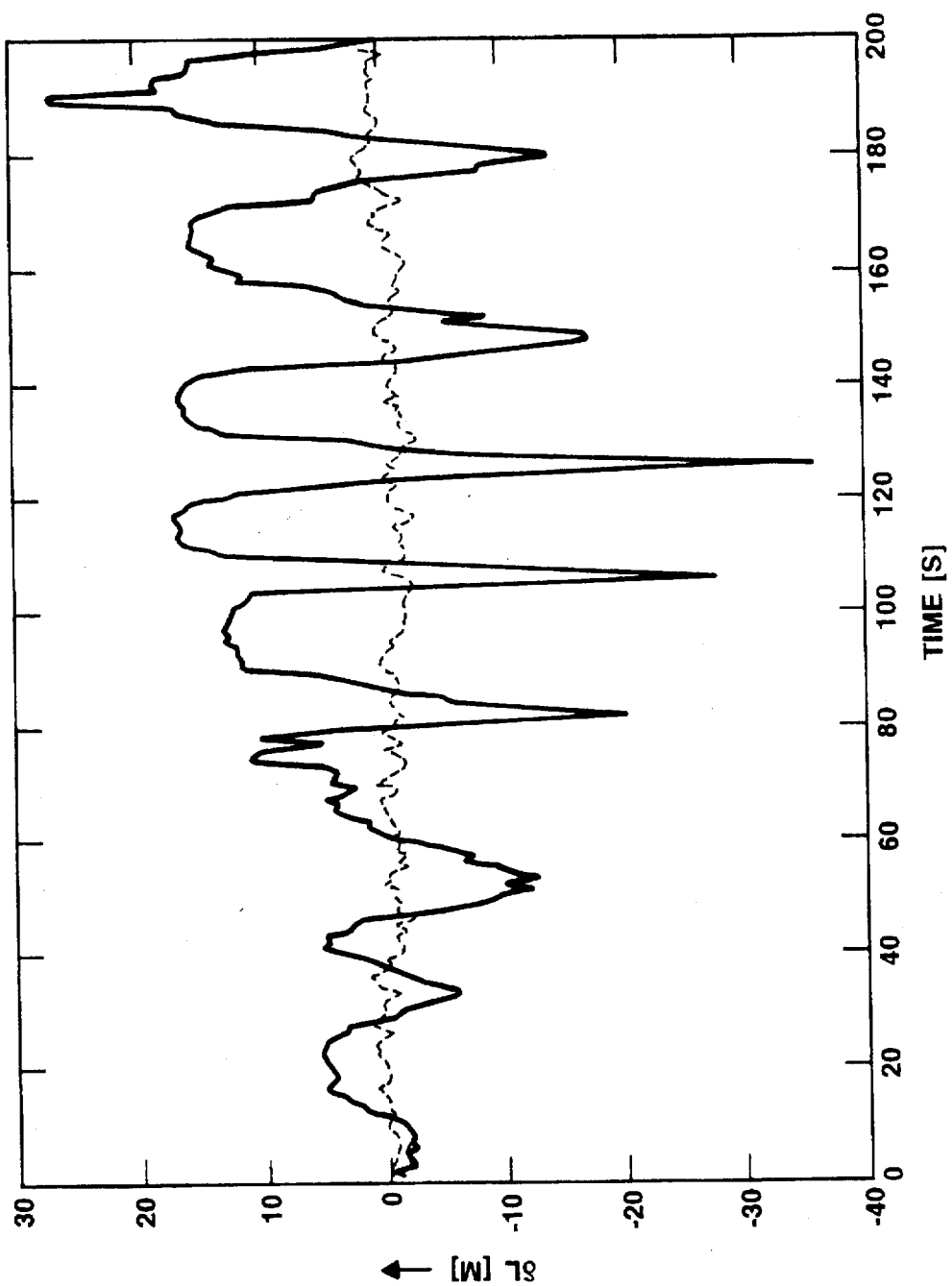
FIG. 8 illustrates the effect of the invention.

The advantageous effect of the invention will now be illustrated by discussing an example with reference to FIG. 8.

A standard GPS antenna was placed in an arbitrary position at the foot of a large building, and the GPS navigation signal was received during some time. This signal was processed in two receivers simultaneously, the first receiver being a standard GPS receiver operating according to the principle as discussed with reference to FIG. 4, whereas the other receiver was set up to operate in accordance with the principles of the present invention. $M_{max}$ was chosen to be equal to 1 (one). The iterations were stopped when $\tau_0$ changed less than 0.1 ns between two successive iteration steps, or after 10 iteration steps, whichever occurred earlier. The number of (complex) samples was 20. The distance between the samples was one-twentieth of the duration of a chip for the first ten samples, and one-tenth of the duration of a chip for the following ten samples. Formula (14) was used for f. The integration time was 1 s.

FIG. 8 shows the fluctuations $\delta\tau$ of the delay time $\tau_0$ of the line of sight peak as calculated by both receivers, translated into a distance measure $\delta L$ according to the formula $\delta L = c\delta\tau$, plotted against the time t. At time t=0, the calculated values were used as reference values and set at zero; the values plotted in FIG. 8 for t>0 are the values as calculated and subtracted from said reference values.

The solid line indicates the fluctuations occurring in the standard GPS receiver's calculations. Due to multipath, the calculated distance measure fluctuates between extreme values which are about 60 m apart, with a standard deviation of the calculated distance measure of more than 10 m.

The broken line indicates the fluctuations occurring in the second receiver set up to operate in accordance with the principles of the present invention. Although, probably due to noise, the calculated distance measure still fluctuates, the extreme values are only about 5 m apart, while the standard deviation of the errors is reduced to 1.1 m, i.e., an improvement by a factor of 10.

Figure 9:
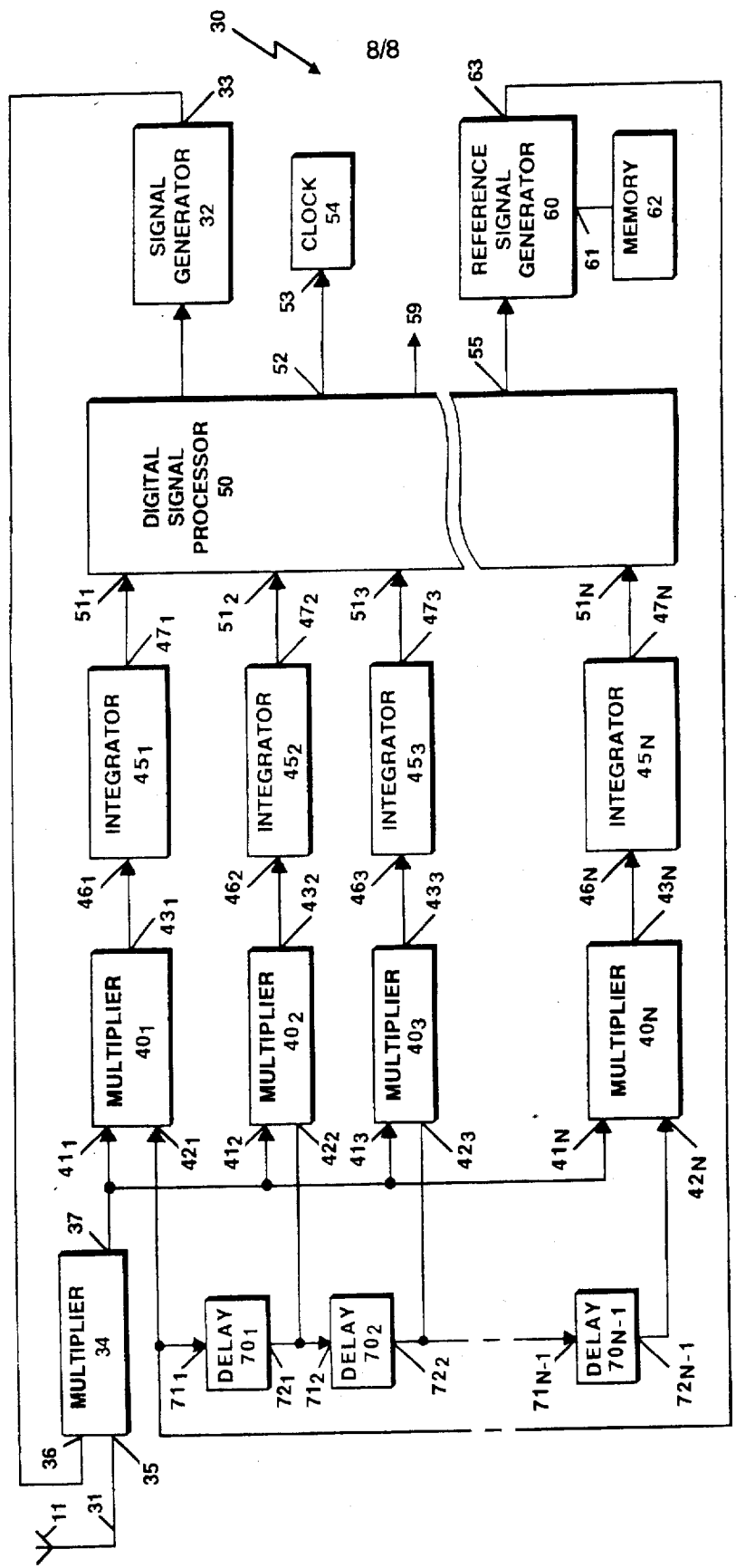
FIG. 9 illustrates an example of a device according to the invention.

In the following, an exemplary embodiment of the processing device 30 according to the invention will be described in more detail with reference to FIG. 9.

As described above, a receiver 10 comprises an input (antenna) 11 for receiving the navigation signal 4. The signal 4 as received is led to an input 31 of the processing device 30, which input 31 is coupled to a first input 35 of a multiplier 34. It is noted that, if desired, the signal 4 as received may be amplified and/or downconverted to a predetermined intermediate frequency, and then digitized, before being led to the first input 35 of the multiplier 34, as will be clear to a person skilled in the art; for the sake of simplicity, the amplifying means, downconverting means and digitizing means are not shown in FIG. 9.

The processing device 30 comprises a generator 32 for generating a signal with frequency $\omega$. An output 33 of the generator 32 is coupled to a second input 36 of the multiplier 34. In the multiplier 34, the signal 4 as received is demodulated, and the demodulated received navigation signal 5' is provided at an output 37 of the multiplier 34.

It is noted that the signal to be processed is to be treated as a complex signal, for which reason the generator 32 in fact has at least two outputs, one providing a signal which can be referred to as cos ($\omega t$), and the other providing a signal which has a phase difference of $\pi/2$ with respect to the first signal and which can be referred to as sin ($\omega t$). The cos ($\omega t$) signal is used to process the real (in phase) part of the received signal, whereas the sin ($\omega t$) signal is used to process the imaginary (quadrature) part of the received signal. Both processing operations are in principle identical. Therefore, for the sake of simplicity, in FIG. 9 only one output 33 of the generator 32 is illustrated, and the combination of said output signals will hereinafter be referred to as exp($j\omega t$), as will be clear to a skilled person.

The processing device 30 comprises a plurality of N multipliers $40_1, 40_2, 40_3, \ldots 40_N$, referred to in the following as the multipliers $40_k$, k being an integer in the interval from 1 to N, wherein N corresponds to the number of samples to be taken from the received navigation signal 5'. Each multiplier $40_k$ has a first input $41_k$, a second input $42_k$, and an output $43_k$. Each first input $41_k$ of the multipliers $40_k$ is coupled to the output 37 of the multiplier 34 to receive the demodulated received navigation signal 5' r(t)·exp($j\omega t$).

The processing device 30 comprises a plurality of N integrator means $45_k$. Each integrator means $45_k$ has an input $46_k$ coupled to the output $43_k$ of an associated multiplier $40_k$, and an output $47_k$ coupled to an input $51_k$ of a digital signal processor 50, which may be a computer, as will be clear to a person skilled in the art. The integrator means $45_k$ are arranged for summation of the samples received at their inputs $46_k$ during a predetermined period T, delivering the result of this summation operation at their outputs $47_k$, and then restarting a new summation operation from zero.

The digital signal processor 50 has a clock input 52 coupled to an output 53 of an accurate clock means 54.

Further, the digital signal processor 50 has a control output 55 for controllably driving a local reference signal generator 60, which has an output 63 for providing the local reference signal 6 (FIG. 1). The local reference signal generator 60 has a reference input 61 coupled to a memory 62, in which information relating to the characteristic code of the navigation signal 5 is stored, as described above. Although this is not shown in FIG. 9, the memory 62 may contain information relating to a plurality of characteristic codes of different satellites, while the local reference signal generator 60 may selectably receive information of only one of said codes, such as to selectably tune to the navigation signal of a predetermined satellite, as will be clear to a person skilled in the art.

The processing device 30 comprises a plurality of N–1 delay means $70_1, 70_2, 70_3, \ldots 70_{N-1}$, referred to in the following as the delay means $70_n$, n being an integer in the interval from 1 to N–1. Each delay means $70_n$ has an input $71_n$ and an output $72_n$, and is arranged to provide at its output $72_n$ a copy of a signal received at its input $71_n$ delayed over a delay time $D\tau_n$. In an embodiment, all delay means $70_n$ provide the same delay time $D\tau$. The delay means are coupled in series, such that the input $71_n$ of a delay means $70_n$ is coupled to the output $72_{n-1}$ of a previous delay means $70_{n-1}$. The input $71_1$ of the first delay means $70_1$ is coupled to the output 63 of the local reference signal generator 60, which is also coupled to the second input $42_1$ of the first multiplier $40_1$. The output $72_n$ of each delay means $70_n$ is coupled to the second input $42_{n+1}$ of an associated multiplier $40_{n+1}$.

The digital signal processor 50 is programmed to drive the local reference signal generator 60 in accurate synchronization with the time periods as specified by the clock means 54. However, the digital signal processor 50 may shift the beginning of the first chip C(1) of the local reference signal 6 with respect to the beginning $t_0$ of a time period by a certain bias shift $\tau_b$, as will be explained later. Then, each multiplier $40_k$ receives at its second input $42_k$ a local reference signal 6 which is shifted with respect to the beginning $t_0$ of a time period by a shift time $\tau_k$ according to the formula $$\tau_k = \tau_b + \sum_{n=1}^{k-1} D\tau_n.$$

This shifted local reference signal 6 can be expressed as $p_k(t) = p(t - \tau_k)$.

At its output $43_k$, each multiplier $40_k$ provides a multiplied signal 7 which can be expressed as r(t)·exp($j\omega t$)·p(t–$\tau_k$).

Therefore, each integrator means $45_k$ provides at its output $47_k$ a signal which can be expressed as $$\frac{1}{T} \int_{t=0}^{T} r(t) \cdot \exp(j\omega t) \cdot p(t - \tau_k)$$

and which constitutes a sample at $\tau = \tau_k$ of the in-phase/quadrature downconverted correlation function $R_x(\tau)$.

Said samples are "refreshed" after each integration period T and read by the digital signal processor 50 at its inputs $51_k$. The digital signal processor 50 is programmed to calculate the sets of equations (4), preferably using the iteration steps as described with reference to FIG. 6, in which said samples read at its inputs $51_k$ are utilized. Preferably, in the case of a GPS system, the integration period T is chosen not to exceed 10 ms in order to get proper data estimates. However, this does not mean that it is absolutely necessary that the digital signal processor 50 calculates the entire sets of equations (4) once every 10 ms; where only ionospheric changes play a role of importance, it suffices to calculate the sets of equations (4) once every second or even less often.

More particularly, in the case of a GPS system, it is possible to estimate the phase of the carrier wave once every 10 ms in a conventional way. From this estimated phase, the data and the frequency deviation of the local generator can be determined. The frequency deviation thus determined is used for controlling the frequency of the signal generator and the code generator, such that their frequency error remains substantially zero. The calculated data, which is present in the form of phase jumps, is used to remove the data from the correlation samples by multiplying the correlation samples with the estimated data bits, after which the thus multiplied correlation samples can be averaged over 1 sec or more. In order to obtain precise estimates of the phase and the delay, it then suffices to calculate the sets of equations (4) once every second or even less often.

Based on the calculated phase and delay estimates, the digital signal processor 50 controls the generator 32 and the local reference signal generator 60, which comprise, preferably, a numerically controlled oscillator. More specifically, the generator 32 is controlled such that $\hat{\theta}_0$ is approximately zero. By amending the bias shift $\tau_b$, the local reference signal generator 60 is controlled in such a way that the peak is kept within the delay window D. Alternatively, it is possible to control the local reference signal generator 60 in such a way that the phase of the maximum of the correlation function of the received signal is zero. For more information, reference is made to Spilker, who describes a tracking loop and delay lock loop which are designed for assuring that one of the samples substantially coincides with the top of the estimated line of sight peak, while two other samples are situated symmetrically around said peak.

The digital signal processor 50 further has a data output 59 for feeding the calculated estimates to a suitable display means such as a plotter, a printer or a CRT, and/or to a suitable storage means such as a computer memory, as is well known in the art. In practice, the results are fed into a computer, which also receives the estimated results for several other transmitters in order to be able to calculate the exact position of the receiver. This calculation is identical to the calculation performed in existing receivers.

For the sake of completeness, it is noted that in reality two multipliers 34 are present, the first one receiving said signal cos ($\omega$t) and the second one receiving said signal sin ($\omega$t) at their respective second inputs 36, such that their respective outputs 37 provide the in-phase navigation signal 5' and the quadrature navigation signal 5', respectively. Further, it is noted that the circuitry of the means 40, 45 and 70 is present in duplicate, for processing said in-phase navigation signal 5' and said quadrature navigation signal 5', respectively.

It will be evident that the described embodiments of the invention may be amended or modified by a person skilled in the art without departing from the scope of the invention or the scope of the claims. For instance, in cases where it suffices to only process the real (in phase) part of the received signal, formula (4) simplifies into formula (4A):

$$\hat{\tau}_i = \max_\tau \left\{ Re \left[ \left( R_x(\tau) - \sum_{\substack{m=0 \\ m \neq i}}^{M_{\alpha}} \hat{a}_m \cdot R(\tau - \hat{\tau}_m) \right) \cdot \exp(-\hat{j\theta}_0) \right] \right\} \quad (4A)$$

-continued
$$\hat{a}_i = Re \left[ \left( R_x(\hat{\tau}_i) - \sum_{\substack{m=0 \\ m \neq i}}^{M_{\alpha}} \hat{a}_m \cdot R(\hat{\tau}_i - \hat{\tau}_m) \right) \cdot \exp(-\hat{j\theta}_0) \right]$$

$$\hat{\theta}_0 = \arg(R_x(\hat{\tau}_0))$$

Further, it is possible to use other suitable functions for the shape parameters f and g as described, as long as the used function for f is a continuously descending or ascending function.

What is claimed is:

1. A positioning signal processing system which receives from a transmitter a data carrying carrier modulated with a pseudo random noise signal, and processes the received data carrying signal to determine a propagation time $\tau_0$ indicative of the time it takes the received data carrying signal to propagate directly from the transmitter to the positioning signal processing system, the system comprising:

a signal source for providing a reference signal;

means for performing a correlation operation on the received data carrying signal with said reference signal in order to provide a measure of the shape of the correlation function $R_x(\tau)$ of the received data carrying signal;

means for iteratively estimating the multipath-induced contribution to the correlation function and subtracting said estimated multipath-induced contribution from the correlation function to obtain an estimated line of sight contribution to the correlation function; and means for calculating the propagation time $\tau_0$ from said estimated line of sight contribution to the correlation function.

2. The system of claim 1 wherein said noise source comprises a pseudo random noise source.

3. A signal processing system which receives from a transmitter and processes a data carrying carrier modulated with a pseudo random noise signal, the system comprising:

means for receiving the transmitted signal and providing a received data carrying signal;

a signal source which provides a reference signal;

means for performing correlations on said received data carrying signal with said reference signal at a plurality of points along the correlation function $R_x(\tau)$ of said received data carrying signal to provide a measure of the shape of the correlation function $R_x(\tau)$;

means for estimating a multipath-induced contribution to the correlation function;

means for subtracting said estimated multipath-induced contribution from the correlation function to obtain an estimated line of sight contribution to the correlation function; and means for calculating a propagation time $\tau_0$ for said signal propagating between the transmitter and said signal processing system, said propagation time $\tau_0$ being calculated from said estimated line of sight contribution to the correlation function.

4. The system of claim 3 wherein said signal source comprises a pseudo random noise source.

5. The system of claim 4 wherein said means for calculating comprises a processor.

6. The system of claim 4 wherein said means for performing correlations comprises a plurality of multipliers each of which multiplies said reference signal at an associated one of said points along the correlation function $R_x(\tau)$ with said reference signal and provides a product signal to an associated one of a plurality of integrators each of which provides a correlation signal.

7. A GPS receiver which receives from a transmitter a data carrying carrier modulated with a pseudo random noise signal, and processes the received data carrying signal to determine an estimated propagation time $\tau_0$ indicative of the time it takes the received data carrying signal to propagate directly from the transmitter to the receiver, the receiver comprising:

means for providing a plurality of delayed reference signals wherein each of said delayed reference signals has been delayed in time by a different mount;

means for performing, for each of said plurality of delayed reference signals, a correlation operation with said received data carrying signal and for providing a plurality of correlation signal values indicative thereof;

means for estimating multipath-induced correlation signal values for each of said plurality of correlation signal values;

means for subtracting each of said estimated multipath-induced correlation signal values from its associated one of said plurality of correlation signal values to obtain an estimated line of sight signal correlation contribution for each of said plurality of correlation signal values; and means for calculating the estimated propagation time $\tau_0$ from said estimated line of sight signal correlation contributions.

8. The GPS receiver of claim 7, wherein said means for performing includes a plurality of correlators each of which provides one of said plurality of correlation signal values.

9. A GPS receiver which receives from a transmitter a data carrying carrier modulated with a pseudo random noise signal, and processes the received data carrying signal to determine an estimated propagation time $\tau_0$ indicative of the time it takes the received data carrying signal to propagate directly from the transmitter to the receiver, the receiver comprising:

a signal source which generates and provides a reference signal;

a time delay network responsive to said reference signal, for providing a plurality of delayed reference signals wherein each of said delayed reference signals has been delayed in time by a different amount;

a plurality of correlators, each responsive to an associated one of said plurality of delayed reference signals, for performing a correlation operation with said received data carrying signal and providing a plurality of correlation signal values indicative thereof; and a processor which estimates a multipath-induced correlation contribution for each of said plurality of correlation signal values, subtracts each of said estimated multipath-induced correlations from its associated one of said plurality of correlation signal values to obtain an estimated line of sight signal correlation contribution for each of said plurality of correlation signal values, and calculates the estimated propagation time $\tau_0$ from said estimated line of sight signal correlation contributions.

10. The GPS receiver of claim 9 wherein said signal source generates said reference signal as a pseudo random noise coded signal.

11. The GPS receiver of claim 9, wherein said processor estimates said multi-path induced correlation signal value for each of said plurality of correlation signal values by, estimating a plurality of line of sight signal values each uniquely associated with one of said plurality of correlation signal values and providing a plurality of preliminary estimated line of sight signal values indicative thereof, and subtracting each of said preliminary estimated line of sight signal values from its associated correlation signal value to provide said estimated multipath-induced correlation signal values.

12. A GPS signal processing system which receives from a transmitter a data carrying carrier modulated with a pseudo random noise signal, and processes the received data carrying signal to determine an estimated propagation time $\tau_0$ indicative of the time it takes the received data carrying signal to propagate directly from the transmitter to the GPS signal processing system, the system comprising:

means for providing a plurality of delayed reference signals wherein each of said delayed reference signals has been delayed in time by a different amount;

means for performing, for each of said plurality of delayed reference signals, a correlation operation with said received data carrying signal and providing received correlation signal values indicative thereof;

means for providing an initial estimate of a line of sight signal contribution to said received correlation signal values, and providing initial estimated line of sight signal values indicative thereof;

means for estimating, subtracting and calculating until a stop criterion has been satisfied, comprising means, responsive to the estimated line of sight signal values, for estimating multipath-induced correlation signal values for each of said plurality of received correlation signal values;

means for subtracting each of said estimated multipath-induced correlation signal values from its associated one of said plurality of received correlation signal values to obtain a new estimated line of sight signal correlation contribution for each of said plurality of received correlation signal values; and means for calculating the estimated propagation time $\tau_0$ from said new estimated line of sight signal correlation contribution.

13. The system of claim 12, further comprising:

means for estimating a second multipath-induced correlation signal value for each of said received correlation signal values;

means for subtracting each of said estimated first and second multipath-induced correlation signal values from its associated one of said plurality of received correlation signal values to obtain a second estimated line of sight signal correlation contribution for each of said plurality of received correlation signal values; and means for calculating the estimated propagation time $\tau_0$ from said second estimated line of sight signal correlation contributions.

14. The system of claim 13, wherein said means for providing comprises:

a signal source which provides a reference signal; and a time delay network which receives said reference signal and includes a plurality of time delay elements, which provide said plurality of delayed reference signals.

\* \* \* \* \*